Oct. 31, 1961 G. G. LORCH 3,006,167
EUTECTIC TANK
Filed June 5, 1958

INVENTOR.
GLENN G. LORCH
BY Price and Heneveld
ATTORNEYS

United States Patent Office 3,006,167
Patented Oct. 31, 1961

3,006,167
EUTECTIC TANK
Glenn G. Lorch, Grand Rapids, Mich., assignor to Kari Kold Company, Grand Rapids, Mich., a corporation of Michigan
Filed June 5, 1958, Ser. No. 740,110
4 Claims. (Cl. 62—438)

The invention relates to storage facilities for perishable food goods and more particularly to a eutectic tank for holdover cold storage cabinets of a portable nature.

Holdover cold boxes are used by many vendors of perishable food goods. Such cold storage boxes generally include an insulated cabinet having some means of maintaining a low temperature condition therein. A most suitable and acceptable means of maintaining a low temperature condition in a cold storage box is by the use of a eutectic tank.

A eutectic tank is a double walled structure which is received within the cold storage cabinet. A eutectic solution is disposed between the double walls of the eutectic tank. The eutectic solution is frozen by internal or external refrigerating means which are connected to the tank. After the solution is frozen the refrigerating means are inactivated and the frozen solution in the tank continues to maintain a low temperature condition within the cold box cabinet over extended periods of time.

Great care has always been required in the construction of eutectic tanks to make them strong enough, at the right places, to withstand the expansive force of the solution as it freezes. It has also been necessary to exercise great care in freezing the eutectic solution. Pocket areas of unfrozen solution can result from non-uniform freezing of the solution and can cause considerable damage by bursting or rupturing tank corners and seams upon subsequently reaching a solidified state. To some extent, this problem is present in any eutectic tank in which the eutectic is actually changed from a liquid to a solid state. However, the problem was never too acute in eutectic tanks in which the refrigerating lines were arranged in a zigzag pattern lying entirely in one or more planes. However, when the construction of eutectic tanks was begun in which the refrigerating line was led in at the bottom of the eutectic tank and then positioned in a spiral around the merchandise chamber, the tanks started bursting with appalling regularity in the corners, usually at a point midway between two adjacent turns of the refrigerating line spiral. It was experimentally determined that this failure occurred in the following manner: the lowermost turn of the spiral, being the coldest one because it was nearest the refrigerant inlet, was the first to build up a more or less cylindrical coating of solidified eutectic. This coating continued to grow in a radial direction as time went on. Shortly after a coating began to form on the lowest turn of the spiral, a similar coating started to form on the second turn of the spiral. The liquid eutectic displaced by the increase in volume of the eutectic as it solidified was displaced in a spiral direction upwardly between the refrigerating lines forming the spiral. Eventually, the coat of frozen eutectic at the beginning of the first turn of the spiral and the beginning of the second turn of the spiral bridged over, i.e. fused together. As time went by, the junction of these two coats of frozen eutectic kept progressing farther and farther upward along the spiral. In so doing, it displaced the liquid eutectic along the spiral ahead of it. In the corners, however, the walls of the eutectic tank were a little farther removed from the refrigerating lines than along the straight sides of the eutectic tank. Consequently, as the bridging of the eutectic coatings around two adjacent refrigerating lines reached a corner, the bridging occurred beyond the corner before the entire corner had had time to freeze. When this happened, there was no way for the liquid eutectic pocket at the extreme outside of the corner to be displaced along the spiral, and as a result this liquid eutectic pocket had to expand in the only direction possible, i.e., by bursting the tank.

The present invention solves this problem by forming the eutectic tank in such a manner that the outside walls of the eutectic tank are at all points equidistant from the inner walls of the outside eutectic tank and from the spiraling refrigerating lines, except as discussed hereafter in connection with FIGURE 2. Thus, the bridging of the frozen eutectic coats occurs steadily and progressively, and all liquid eutectic is forced around the spiral ahead of the bridge and up into the expansion space provided for it at the top of the tank.

It is an object of this invention to disclose a eutectic tank of sturdy construction and one having internal refrigerating lines for maximum efficiency.

Another object of this invention is to disclose a eutectic tank having the refrigerating lines uniformly spaced relative to each other and the tank walls for more uniform freezing of the eutectic solution.

The eutectic tank of this invention is constructed to have a vacuum drawn on the tank as it is filled with eutectic solution. This provides a vacuum space at the top of the tank for the subsequent expansion of the eutectic solution as it is frozen. The eutectic solution is progressively frozen from the bottom of the tank towards the top in the manner previously explained which, in combination with the concepts underlying this invention, avoids the chance of unfrozen pocket areas in the tank.

The eutectic tank of this invention includes internal structural reinforcement which permits the vacuum to be drawn and which also serves as a spacing guide for the internal refrigerating lines.

Still another object of this invention is to disclose a tank construction having internal corner areas rounded or otherwise filled to avoid pocket areas for the collection of unsolidified eutectic solution. The corner areas of the conventionally known eutectic tanks provide pocket areas for unfrozen solution and are readily damaged due to the excessive forces of expansion upon solidification of such captured solution.

A still further object of this invention is to disclose a particular means of filling the corner areas of a eutectic tank which also serves other purposes. A conduit for a thermostat control bulb may be received within a corner area of a tank. The bulb receiving conduit both fills the corner to avoid a pocket area for unfrozen solution and also is positioned to provide maximum temperature sensitivity for the thermostat. In this embodiment, blocking of the spiral displacement path by bridging occurring first in the restricted corner is rendered immaterial by the presence of the vertical return end of the refrigerant line, which is always the warmest part of the refrigerant line and hence the last to freeze. Hence, the return line provides a riser path along which displaced liquid can flow if the restricted corner blocks the usual spiral path.

The aforementioned and other advantages in the practice of this invention will be more apparent in the description of a cold box eutectic tank made in accord with the teachings of such invention.

Figure 1:
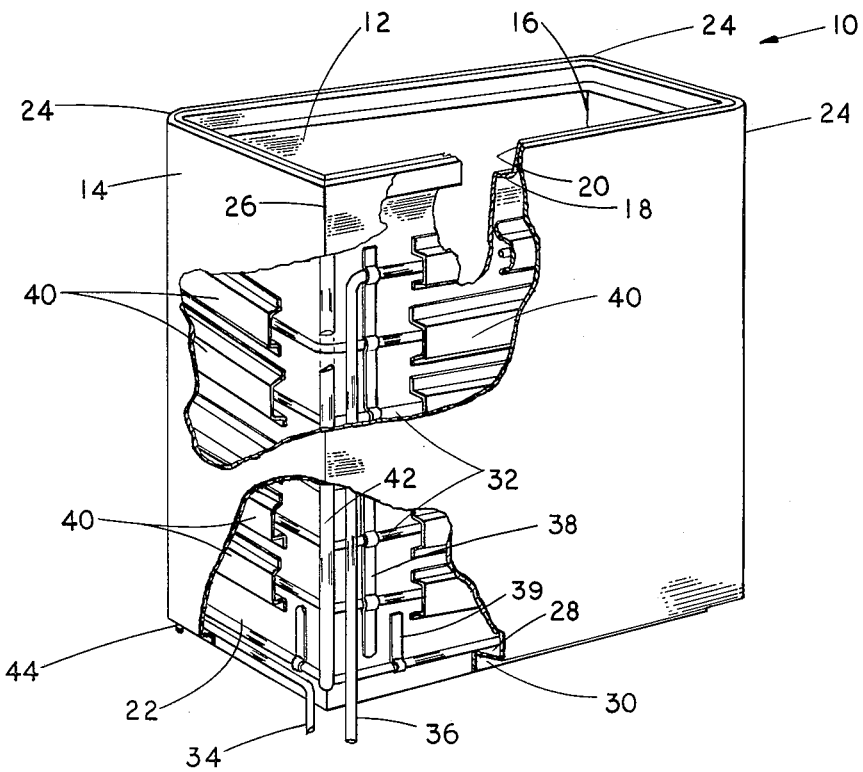
FIG. 1 is a perspective view of the eutectic tank of this invention and having parts broken away to better show the construction thereof.
Figure 2:
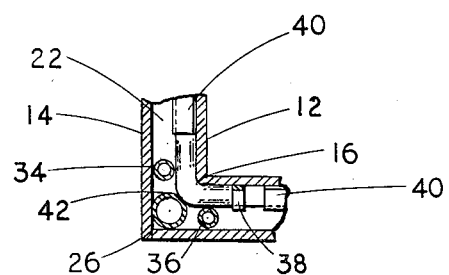
FIG. 2 is a cross sectional view of a corner of the disclosed eutectic tank.
Figure 3:
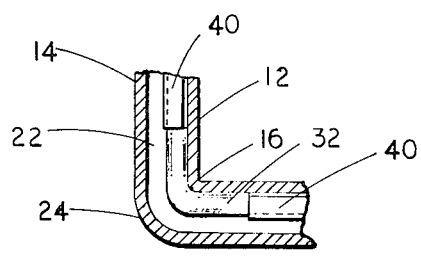
FIG. 3 is a cross sectional view of a different corner of the disclosed eutectic tank.

Referring to the drawings in further detail, there is shown a eutectic tank 10. The tank is open at both top and bottom though it may be built to include a bottom. This particular eutectic tank 10 is formed by inner and outer wall defining members 12 and 14. Each is preferably a one piece sheet metal blank formed to a rectangular shape, as shown. The wall defining members 12 and 14 are concentrically disposed in spaced relation to each other and are secured together near their top and bottom edges as will be described.

The inner wall defining member 12 is formed to include substantially square corners 16. The ends of the blank are welded together and may be disposed to form any one of the internal corners 16. The upper edge of the wall defining member 12 is formed to include a step shoulder 18 and a flange 20. The shoulder portion 18 closes the upper end of the space 22 provided between the wall members 12 and 14. The flange 20 is secured to the upper edge of the outer wall defining member 14 as by seam welding or otherwise.

The outer wall defining member 14 is formed to include rounded corners 24. The ends of the blank are welded together to form an external square corner 26. The lower edge of the outer wall defining member 14 is formed to include a step shoulder 28 and a flange 30. The shoulder portion 28 closes the lower end of the space 22 between the wall members 12 and 14. The flange 30 is secured to the lower edge of the inner wall defining member 12 as by seam welding or otherwise.

Refrigerant tubing 32 is wound around the inner defining tank wall 12. The tubing is disposed within the space 22 provided between the tank walls 12 and 14 and is adapted to have a refrigerant cycled therethrough.

The feed end 34 of the refrigerant tubing 32 extends through a suitable opening provided in the lower tank shoulder 28. The tubing is bent around the corners 16 of the inner wall member 12 and is spiraled upwardly. The return end 36 of the refrigerant tubing 32 is extended from near the upper end of the tank down within a corner area of the tank and through the lower tank shoulder 28. The conduit 32 may be spaced on the inner tank wall 12 by strap brackets 38 and clips 39 as it spirals upwardly. The conduit is also spaced by being extended through wall braces 40. The wall braces 40 are welded to the inner wall member 12. The wall braces 40 assure a uniform spacing of the inner and outer tank defining walls 12 and 14. They also add structural strength to the tank structure. This is particularly important when a vacuum is drawn on the eutectic tank, during the filling of the tank with eutectic solution, to prevent the tank walls from collapsing together.

The supply and return ends 34 and 36 of the refrigerant tubing 32 may be disposed within a square corner area of the outer wall member 14. Such supply and return lines will thus serve to fill the square corner area and avoid an oversized pocket area. In the present instance the external wall is formed to have only one square corner and a thermostat bulb well, provided by a hollow tube 42, is disposed within the square corner area 26 to serve such purpose. Aside from serving the purpose mentioned, this proves an ideal location for the thermostat control bulb. The walls of the bulb retaining conduit 42 are surrounded by the eutectic solution and so the thermostat control bulb is responsive to the slightest temperature change. This in turn reduces the running time of the condensing unit to a minimum and assures greater operational economy.

It will be noted that the curved or rounded corners 24 of the outer tank wall 14 provide an internal surface of curvature that closely complements the form of the refrigerant conduit 32 as it is bent around the square corners 16 of the inner tank wall 12. The internal radius of curvature of the corner areas of the external tank wall are preferably equal to or less than the spacing between the inner and outer side walls of the tank. This avoids any pocket areas which would otherwise exist in the corners and assures a more uniform distribution of the eutectic solution between the tank walls and relative to the refrigerating lines.

The eutectic tank may be made to include only one square corner area 26 and may have that filled with the thermostat bulb well 42, as mentioned. If another square corner is provided it might be filled with either or both of the fill and return lines 34 and 36 of the refrigerating tubing. It is also possible to fill a square corner area with a dummy thermostat bulb well.

The space 22 between the tank walls 12 and 14 is filled with eutectic solution by means of a conduit 44 shown here as provided in the bottom of shoulder 28 of the tank. It might be disposed elsewhere.

The filling operation includes drawing a vacuum on the tank and filling the tank with eutectic solution to a predetermined level. The remaining space provides room for expansion as the eutectic material freezes. After filling, the tank is hermetically sealed to guard against the loss of eutectic and corrosive action due to the nature of the eutectic solution.

The eutectic solution is a brine or salt base solution. Generally it is a concentration of one of the chlorides, in water. The composition and characteristics of the eutectic solution are sufficiently known to need no further explanation.

The eutectic tank 10 is intended for use with a top opening cold storage cabinet. It is generally placed within an inner shell of the cabinet which has a bottom and so needs no bottom of its own.

As mounted within a cold storage box the tank 10 will have the refrigerating supply and return lines 34 and 36, and the thermostat bulb well 42 exposed for ready use.

As a refrigerating charge is circulated through the tubing 32 the temperature of the eutectic solution begins to drop. The coiled disposition of the refrigerating line 32 from the bottom of the tank upward causes the solidification of the eutectic solution to progress from the bottom of the tank upward as the temperature of the solution drops. The freezing of the solution thus progresses uniformly spirally upward towards the expansion space at the top of the tank. The refrigerant tubing is spaced within the guiding brackets 40 and by the retaining straps and clips 38 to more uniformly lower the temperature of the eutectic solution to a freezing condition. The rounded corners and filled square corner areas further assure uniform freezing of the solution and the absence of liquid retaining pocket areas.

There is considerably less stress and strain on the eutectic tank which makes use of the teachings of this invention. Since the eutectic tank, by nature, is required to be repeatedly subjected to the refrigeration of the solution it holds, this means a considerably longer serviceable life for such tanks.

While a preferred embodiment of this invention has been described it will be understood that other modifications and improvements may be made thereto. Such of these modifications and improvements as incorporate the principles of this invention are to be considered as included in the hereinafter appended claims unless these claims by their language expressly state otherwise.

I claim:

1. A eutectic tank for holdover cold boxes, and comprising; inner and outer wall defining members disposed in concentric spaced relation and having the upper and lower edges thereof secured together to provide a closed space therebetween, said inner wall defining member being formed to a rectangular shape and having substantially square corners, said outer wall defining member having at least one square corner, all other corners of said outer wall defining member being rounded, a eutectic solution received within said closed space between said wall defining members, refrigerating lines received within said closed space with said eutectic solution and spirally coiled about said inner wall defining member, said refrigerating lines being spaced substantially uniformly from said outer wall defining member along the sides and at the rounded corners thereof, and the turns of said refrigerating line spiral being uniformly spaced from one another, and means received within said square corner formed by said outer wall for eliminating the pocket area otherwise existing in such corner.

2. A eutectic tank for holdover cold boxes, and comprising; concentric spaced annular walls defining a polygonal tank and having the upper and lower edges thereof secured together to form a closed space therebetween, a eutectic solution received within siad space, and refrigerating lines received within said space and spirally coiled about the inner of said walls from the bottom to the top thereof, the eutectic-receiving space between said tank defining walls being radially no greater in the corners of said polygon than along the sides thereof to provide a uniform distribution of eutectic solution between said walls and relative to said refrigerating lines.

3. In a eutectic tank for holdover cold boxes having inner and outer walls, said inner walls defining a merchandise storage chamber, and said inner and outer walls defining a eutectic tank between them; a eutectic solution in said tank; an expansion space at the top of said tank; and means including a refrigerating line generally spirally disposed in said tank for progressively solidifying said eutectic solution in a generally spiral upwardly directed path; said inner walls being of a geometrical shape having at least one corner, and said refrigerating line being bent around said corner; the improvement comprising means obstructing said corner sufficiently to prevent the radial dimension of said eutectic tank in said corner from exceeding the radial dimension of said tank away from said corner to prevent the formation of liquid eutectic pockets during the progressive solidification of the eutectic.

4. In a eutectic tank for holdover cold boxes having inner and outer walls, said inner walls defining a merchandise storage chamber, and said inner and outer walls defining a eutectic tank between them; a eutectic solution in said tank; an expansion space at the top of said tank; and means including a refrigerating line generally spirally disposed in said tank for progressively solidifying said eutectic solution in a generally spiral upwardly directed path; said inner walls being of a geometrical shape having at least one corner, and said refrigerating line being bent around said corner; the improvement comprising means obstructing said corner sufficiently to prevent the radial dimension of said eutectic tank in said corner from exceeding the radial dimension of said tank away from said corner to prevent the formation of liquid eutectic pockets during the progressive solidification of the eutectic, said means including a vertical conduit substantially surrounded by said eutectic and containing temperature sensing means for accurate sensing of the average temperature of said eutectic.

References Cited in the file of this patent

UNITED STATES PATENTS

| | | |
|---|---|---|
| 1,824,158 | Kleist | Sept. 22, 1931 |
| 1,995,167 | Battles | Mar. 19, 1935 |
| 2,444,489 | Baker | July 6, 1948 |
| 2,642,480 | Shave | June 16, 1953 |
| 2,702,992 | Mooser | Mar. 1, 1955 |
| 2,703,480 | Riememschneider | Mar. 8, 1955 |
| 2,831,328 | Kleist | Apr. 22, 1958 |